US012106711B1

(12) United States Patent
Hou et al.

(10) Patent No.: US 12,106,711 B1
(45) Date of Patent: Oct. 1, 2024

(54) DRIVING CIRCUIT AND SYNCHRONIZATION METHOD THEREOF FOR MULTI-PANEL DISPLAY DEVICE

(71) Applicant: Novatek Microelectronics Corp., Hsinchu (TW)

(72) Inventors: Yen-Ju Hou, Hsinchu County (TW); Yung-Yu Hsieh, Yunlin County (TW); Kai-Wen Shao, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/481,239

(22) Filed: Oct. 5, 2023

(51) Int. Cl.
*G09G 3/3208* (2016.01)

(52) U.S. Cl.
CPC ....... *G09G 3/3208* (2013.01); *G09G 2310/08* (2013.01); *G09G 2330/021* (2013.01); *G09G 2330/023* (2013.01)

(58) Field of Classification Search
CPC ............. G09G 3/3208; G09G 2310/08; G09G 2330/021; G09G 2330/023
See application file for complete search history.

(56) References Cited

U.S. PATENT DOCUMENTS 6,262,695 B1 7/2001 McGowan
2002/0044142 A1 4/2002 Fukuda
2016/0132283 A1* 5/2016 Hall .......................... G06T 1/60 361/730
2016/0239249 A1* 8/2016 Lee .......................... G09G 5/12
2021/0358400 A1 11/2021 Wang
2022/0304173 A1* 9/2022 Zou ...................... H05K 5/0021

FOREIGN PATENT DOCUMENTS

CN 111627406 9/2020
CN 114822377 7/2022
CN 115273748 11/2022

OTHER PUBLICATIONS

"Office Action of Taiwan Counterpart Application", issued on Aug. 20, 2024, p. 1-p. 3.

* cited by examiner

*Primary Examiner* — Abhishek Sarma
(74) *Attorney, Agent, or Firm* — JCIPRNET

(57) ABSTRACT

A driving circuit and a synchronization method thereof for a multi-panel display device are provided. The driving circuit includes a first driving chip and a second driving chip which share a power circuit. One of the first driving chip and the second driving chip is set as a master driving chip or a slave driving chip based on a control signal. The master driving chip transmits a power enable signal and a control signal to the power circuit, which triggers the power circuit providing power voltages to the master driving chip and the slave driving chip. When the master driving chip transmits a timing control signal to the slave driving chip, the slave driving chip performs a power synchronization operation to synchronize with the master driving chip based on the timing control signal.

20 Claims, 10 Drawing Sheets

DRIVING CIRCUIT AND SYNCHRONIZATION METHOD THEREOF FOR MULTI-PANEL DISPLAY DEVICE

BACKGROUND

Technical Field

The disclosure relates to a driving circuit, and more particularly, relates to a driving circuit and a synchronization method thereof for a multi-panel display device.

Description of Related Art

With the advantages of low power consumption, wide color range, and flexible, organic light emitting diode (OLED) display has being widely used in display devices. An OLED display can be folded to form multiple display panels within a single display device. For example, an OLED smart phone may include a first display panel and a second display panel located at different surfaces of the OLED smart phone. The first display panel of the OLED smart phone may display a calendar or a weather information, and the second display panel of the OLED smart phone may display a video.

In general, each of the display panels in a multi-panel display device may have independent lighting sequence. Accordingly, each of the display panels in a multi-panel display device may be equipped with a power circuit to meet its power requirement. However, disposing multiple power circuits in a multi-panel display device will increase the cost and the size of the multi-panel display device.

Therefore, how to reduce the number of the power circuits in a multi-panel display device has become a critical issue.

SUMMARY

The disclosure provides a driving circuit and a synchronization method thereof for a multi-panel display device. The driving circuit can perform a power synchronization operation for each of the display panels in the multi-panel display device by using a single power circuit.

In an embodiment of the disclosure, a driving circuit of a multi-panel display device is provided. The driving circuit of a multi-panel display device includes a first driving chip and a second driving chip. The first driving chip is configured to drive a first display panel of the multi-panel display device. The second driving chip is configured to drive a second display panel of the multi-panel display device. The first driving chip and the second driving chip share a power circuit. One of the first driving chip and the second driving chip is set as a master driving chip based on a first control signal, and the other of the first driving chip and the second driving chip is set as a slave driving chip based on a second control signal. The master driving chip is configured to transmit a power enable signal and a control signal to the power circuit, and the power circuit is configured to provide power voltages to the master driving chip and the slave driving chip based on the power enable signal and the control signal. In response to the master driving chip transmitting a timing control signal to the slave driving chip, the slave driving chip performs a power synchronization operation to synchronize with the master driving chip based on the timing control signal.

In another embodiment of the disclosure, a driving circuit of a multi-panel display device is provided. The driving circuit of a multi-panel display device includes a first driving chip and a second driving chip. The first driving chip is configured to drive a first display panel of the multi-panel display device. The second driving chip is configured to drive a second display panel of the multi-panel display device. The first driving chip and the second driving chip share a power circuit, and the power circuit is controlled by a processor. The processor is configured to transmit a power enable signal and a control signal to the power circuit, and the power circuit is configured to provide power voltages to the first driving chip and the second driving chip based on the power enable signal and the control signal. One of the first driving chip and the second driving chip is set as a master driving chip based on a control signal provided by the processor, and the other of the first driving chip and the second driving chip is set as a slave driving chip based on the control signal. In response to the master driving chip transmitting a timing control signal to the slave driving chip, the slave driving chip performs a power synchronization operation to synchronize with the master driving chip based on the timing control signal.

In an embodiment of the disclosure, a synchronization method of a driving circuit is provided, which is adapted to a multi-panel display device. The driving circuit comprises a first driving chip for driving a first display panel of the multi-panel display device and a second driving chip for driving a second display panel of the multi-panel display device. The first driving chip and the second driving chip share a power circuit. The synchronization method includes the following steps. Setting one of the first driving chip and the second driving chip as a master driving chip based on a control signal, and setting the other of the first driving chip and the second driving chip as a slave driving chip based on the control signal. Transmitting a power enable signal and a control signal to the power circuit by the master driving chip. Providing power voltages to the master driving chip and the slave driving chip by the power circuit based on the power enable signal and the control signal. In response to the master driving chip transmitting a timing control signal to the slave driving chip, performing a power synchronization operation by the slave driving chip to synchronize with the master driving chip based on the timing control signal.

Based on the above, in the embodiments of the disclosure, a single power circuit is shared by both a master driving chip and a slave driving chip in a multi-panel display device. The slave driving chip can perform a power synchronization operation to synchronize with the master driving chip based on a timing control signal provided by the master driving chip and based on power voltages provided by the single power circuit. Therefore, the driving circuit and the synchronization method of the disclosure can reduce the number of the power circuits in the multi-panel display device.

To make the aforementioned features more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
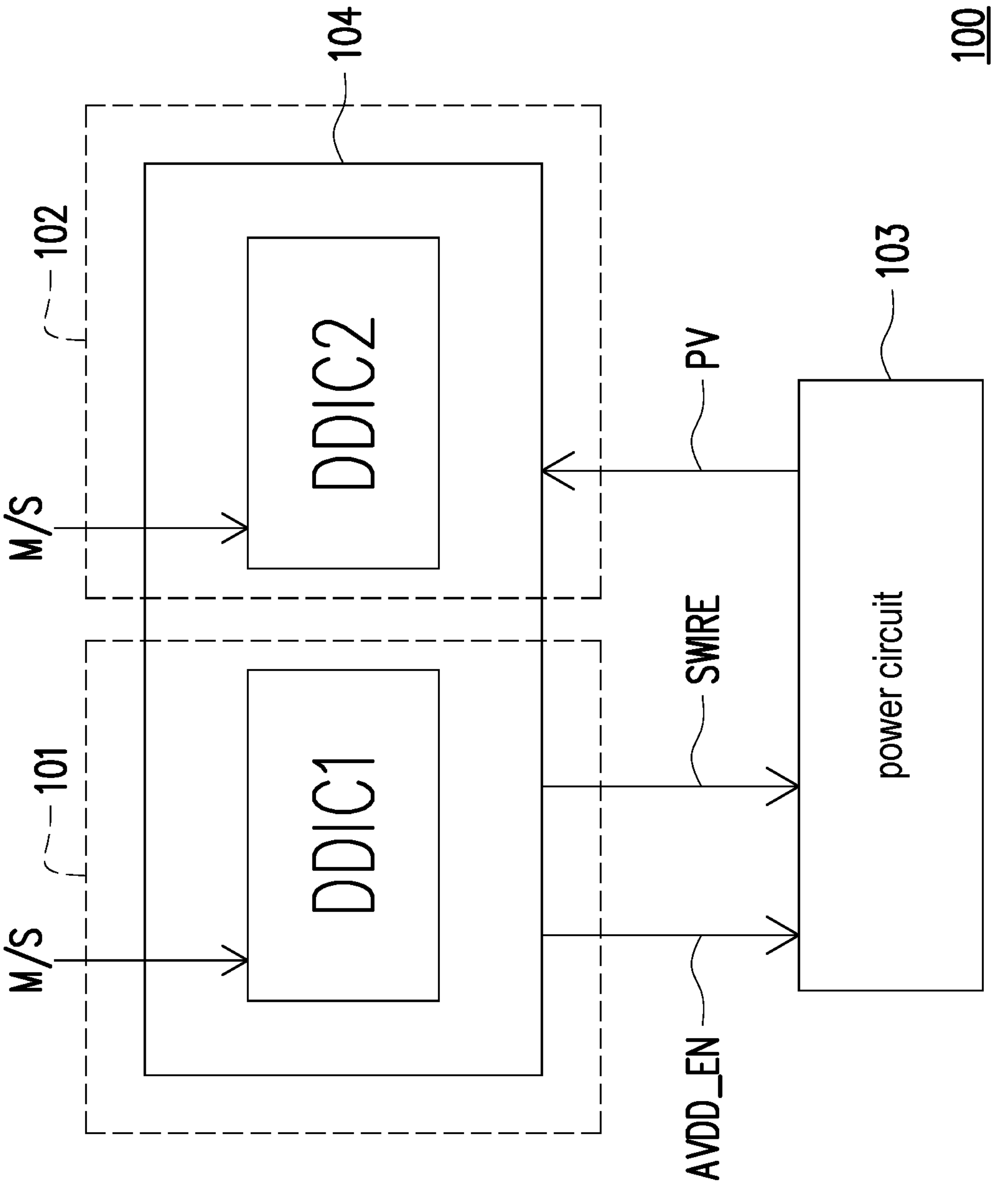
FIG. 1 is a block diagram of a multi-panel display device according to an embodiment of the disclosure.

The term "couple (or connect)" herein (including the claims) are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Moreover, elements/components/steps with same reference numerals represent same or similar parts in the drawings and embodiments. Elements/components/steps with the same reference numerals or symbols in different embodiments may be mutually referenced to the related description.

FIG. 1 is a block diagram of a multi-panel display device according to an embodiment of the disclosure. Referring to FIG. 1, the multi-panel display device 100 includes a first display panel 101, a second display panel 102, a power circuit 103, and a driving circuit 104. The driving circuit 104 includes a first driving chip DDIC1 and a second driving chip DDIC2. The first driving chip DDIC1 and the second driving chip DDIC2 share a single power circuit 103. The first driving chip DDIC1 and the second driving chip DDIC2 may be a display driver integrated circuit, respectively. The power circuit 103 may provide electrical power to the first driving chip DDIC1 and the second driving chip DDIC2, so that the first driving chip DDIC1 and the second driving chip DDIC2 may drive the first display panel 101 and the second display panel 102, respectively. According to design requirements, the power circuit 103 may be realized as a power management integrated circuit (PMIC) which manages the power status of the first driving chip DDIC1 and the second driving chip DDIC2.

For example, the driving circuit 104 in FIG. 1 may transmit a power enable signal AVDD_EN and a control signal SWIRE to the power circuit 103, and the power circuit 103 may provide power voltages PV to the driving circuit 104, so that the power circuit 103 can manage power-on sequences (or power-off sequences) of the first driving chip DDIC1 and the second driving chip DDIC2 to meet different scenarios applicable to the multi-panel display device 100. It is noted that SWIRE interface protocol is a well-known interface protocol for power management IC, and the power enable signal AVDD_EN and the control signal denoted by SWIRE are necessary signals for implementing the SWIRE interface protocol. According to the SWIRE interface protocol, level of power voltages PV output by the power circuit 103 (such as a power management IC) to the display driving chips are controlled by the amount of pulses of the control signal SWIRE.

In the embodiment of FIG. 1, one of the first driving chip DDIC1 and the second driving chip DDIC2 may be set as a master driving chip and the other of the first driving chip DDIC1 and the second driving chip DDIC2 may be set as a slave driving chip. The master driving chip and the slave driving chip may be determined based on an identification control signal M/S. For example, the multi-panel display device 100 may include a processor (not shown) to send a command as an identification control signal M/S to each of the first driving chip DDIC1 and the second driving chip DDIC2. The identification control signal M/S may be a first logic value (e.g. M/S=1) to define a master driving chip in the driving circuit 104, and the identification control signal M/S may be a second logic value (e.g. M/S=0) to define a slave driving chip in the driving circuit 104. In other embodiment, the identification control signal M/S may be a first logic value (e.g. M/S=0) to define a master driving chip in the driving circuit 104, and the identification control signal M/S may be a second logic value (e.g. M/S=1) to define a slave driving chip in the driving circuit 104. In another embodiment, each of the first driving chip DDIC1 and the second driving chip DDIC2 may include a hardware pin for indicating a logic value of the identification control signal M/S, so that the master driving chip and the slave driving chip in the driving circuit 104 can be defined by the hardware pin.

According to design requirements, the multi-panel display device 100 shown in FIG. 1 may be an organic light emitting diode (OLED) display device. When the master driving chip of the driving circuit 104 is determined, the master driving chip of the driving circuit 104 may transmit the power enable signal AVDD_EN and the control signal SWIRE to the power circuit 103. When the power circuit 103 receives the power enable signal AVDD_EN and the control signal SWIRE, the power circuit 103 may provide power voltages PV to both the master driving chip and the slave driving chip of the driving circuit 104. For example, FIG. 2 depicts a detailed connection between the driving circuit 104 and the power circuit 103 shown in FIG. 1 according to an embodiment of the disclosure.

Figure 2:
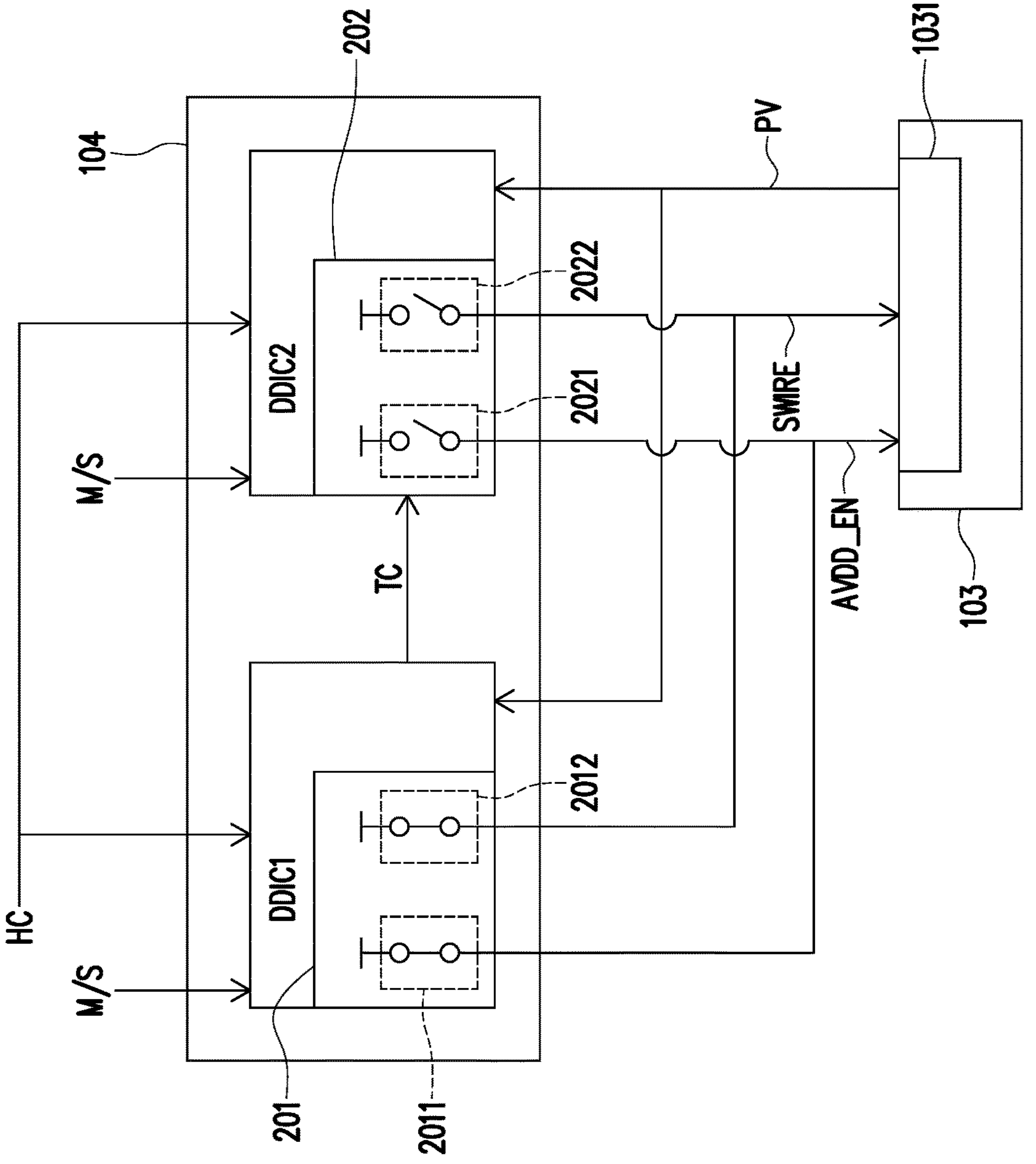
FIG. 2 depicts a detailed connection between the driving circuit 104 and the power circuit 103 shown in FIG. 1 according to an embodiment of the disclosure.

Referring to FIG. 2, the first driving chip DDIC1 of the driving circuit 104 may include a transmission interface 201 for transmitting both an power enable signal AVDD_EN and a control signal SWIRE generated by the first driving chip DDIC1. The second driving chip DDIC2 of the driving circuit 104 may include a transmission interface 202 for transmitting both an power enable signal AVDD_EN and a control signal SWIRE generated by the second driving chip DDIC2. In FIG. 2, the transmission interface 201 of the first driving chip DDIC1 includes a first switch 2011 and a second switch 2012, and the transmission interface 202 of the second driving chip DDIC2 includes a third switch 2021 and a fourth switch 2022. The power circuit 103 may include a communication interface 1031 for communicating with the first driving chip DDIC1 and the second driving chip DDIC2.

As shown in FIG. 2, the first switch 2011 of the first driving chip DDIC1 and the third switch 2021 of the second driving chip DDIC2 are coupled to a first terminal of the communication interface 1031. In addition, the second switch 2012 of the first driving chip DDIC1 and the fourth switch 2022 are coupled to a second terminal of the communication interface 1031. In other embodiment, the first switch 2011 of the first driving chip DDIC1 and the third switch 2021 of the second driving chip DDIC2 may be respectively coupled to different terminals of the communication interface 1031. In other embodiment, the second switch 2012 of the first driving chip DDIC1 and the fourth switch 2022 of the second driving chip DDIC2 may be respectively coupled to different terminals of the communication interface 1031.

Referring to FIG. 2, the first driving chip DDIC1 may be set as a master driving chip by receiving an identification control signal M/S having a first logic value (e.g. M/S=1), and the second driving chip DDIC2 may be set as a slave driving chip by receiving an identification control signal M/S having a second logic value (e.g. M/S=0). Since the first driving chip DDIC1 in FIG. 2 is set as the master driving chip, only the first driving chip DDIC1 is configured to transmit the power enable signal AVDD_EN and the control signal SWIRE to the power circuit 103. Specifically, in response to receive a sleep-out command from a processor (not shown), the first driving chip DDIC1 may turn on both the first switch 2011 and the second switch 2012, and the second driving chip DDIC2 may turn off both the third switch 2021 and the fourth switch 2022. Moreover, in response to receive a sleep-out command from the processor, the first driving chip DDIC1 may transmit a timing control signal TC to the second driving chip DDIC2 to power-on the second driving chip DDIC2.

When the power circuit 103 receives the power enable signal AVDD_EN and the control signal SWIRE through the communication interface 1031, the power circuit 103 may provide power voltages PV to both the first driving chip DDIC1 and the second driving chip DDIC2. In the embodiment of FIG. 2, the driving circuit 104 is used for driving an OLED display device (e.g. the multi-panel display device 100 shown in FIG. 1). Therefore, the power voltages PV provided by the power circuit 103 may include a first supply voltage AVDD, a second supply voltage ELVDD, and a third supply voltage ELVSS. The first driving chip DDIC1 and the second driving chip DDIC2 may use the first supply voltage AVDD to generate pixel switch control signals, such as a scan signal and an emission signal, for OLED pixel circuits in the OLED display device. In addition, the first driving chip DDIC1 and the second driving chip DDIC2 may use both the second supply voltage ELVDD and the third supply voltage ELVSS to generate driving currents for OLED pixel circuits in the OLED display device.

In the embodiment of FIG. 2, the first driving chip DDIC1 (i.e. master driving chip) may transmit a timing control signal TC to the second driving chip DDIC2, so that the second driving chip DDIC2 performs a power synchronization operation to synchronize with the first driving chip DDIC1 based on the timing control signal TC. For example, FIG. 3A is a timing diagram illustrating a power-on sequence synchronization between the first driving chip DDIC1 and the second driving chip DDIC2 shown in FIG. 2 according to an embodiment of the disclosure.

Figure 3A:
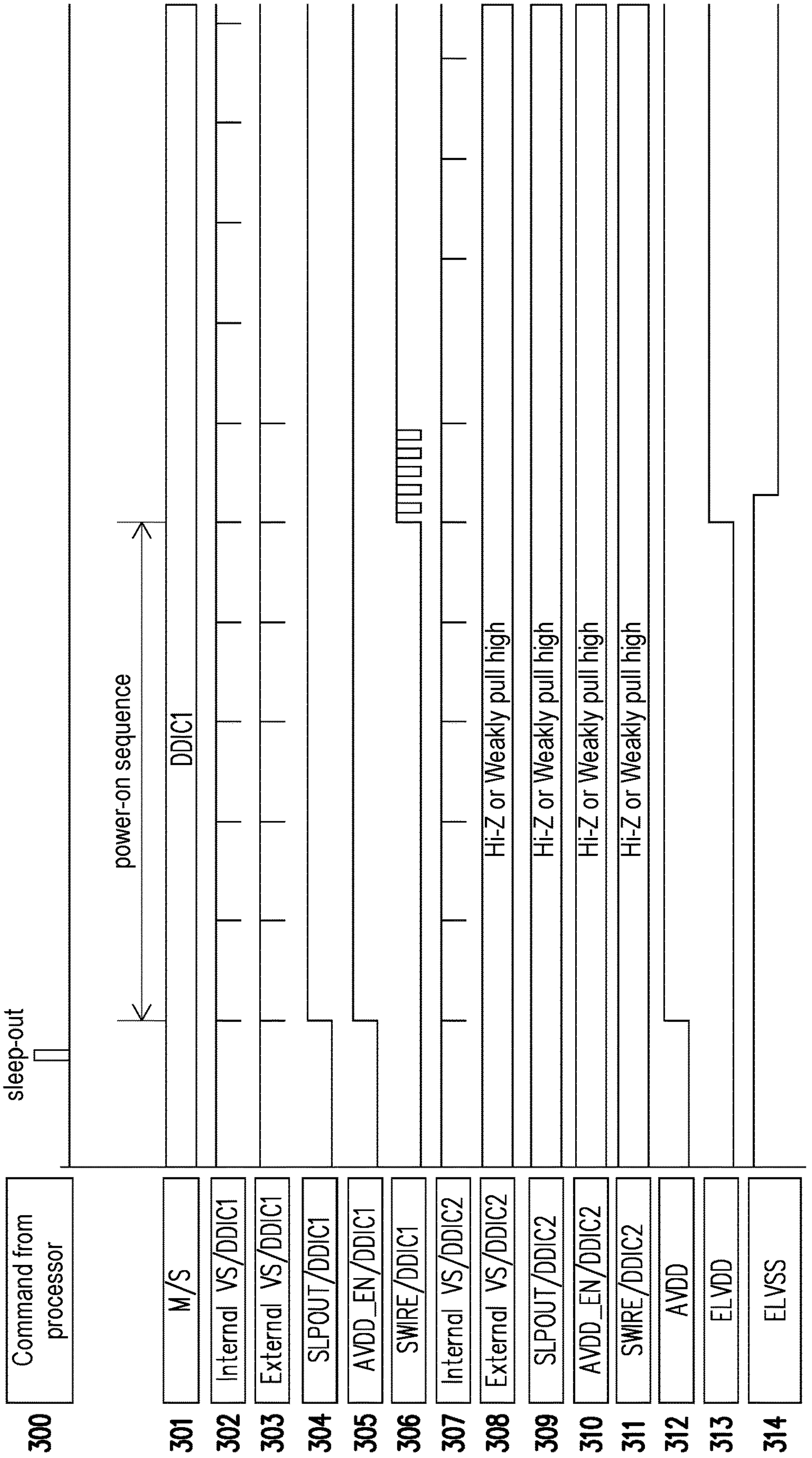
FIG. 3A is a timing diagram illustrating a power-on sequence synchronization between the first driving chip DDIC1 and the second driving chip DDIC2 shown in FIG. 2 according to an embodiment of the disclosure.

In FIG. 3A, the horizontal axis represents a time axis, and the vertical axis represents a signal level (which is a logic level, not actual magnitude). Referring to FIG. 3A, signal 300 represents a command from a processor, and signal 301 represents an identification control signal M/S for defining a master driving chip and a slave driving chip. Signals 302 and 307 represent internal vertical synchronization signals of the first driving chip DDIC1 and the second driving chip DDIC2, respectively. Signals 303 and 308 represent external vertical synchronization signals provided by the first driving chip DDIC1 and the second driving chip DDIC2, respectively. It should be note that the internal vertical synchronization signals and the external vertical synchronization signal are periodic pulse signals. Signals 304 and 309 represent sleep-out synchronization signals SLPOUT provided by the first driving chip DDIC1 and the second driving chip DDIC2, respectively. Signals 305 and 310 represent enable signals AVDD_EN provided by the first driving chip DDIC1 and the second driving chip DDIC2, respectively. Signals 306 and 311 represent the control signal SWIRE provided by the first driving chip DDIC1 and the second driving chip DDIC2, respectively. Signals 312~314 represent power voltages provided by the power circuit 103.

In the embodiment of FIG. 3A, based on a determination of the identification control signal M/S, the first driving chip DDIC1 is set as a master driving chip, and the second driving chip DDIC2 is set as a slave driving chip. Referring to signal 300 in FIG. 3A, the first driving chip DDIC1 is configured to perform a power-on sequence in response to receiving a sleep-out command from a processor, and the second driving chip DDIC2 is configured to perform a power synchronization operation based on the power-on sequence performed by the first driving chip DDIC1. As shown in FIG. 3A, at the beginning of the power-on sequence, the sleep-out synchronization signal 304 (SLPOUT) of the first driving chip DDIC1 is pulled to a high logic level and the power enable signal AVDD_EN of the first driving chip DDIC1 is pulled to a high logic level. The first driving chip DDIC1 may transmit timing control signals TC, e.g., the signal 303 (external VS) and the sleep-out synchronization signal 304 (SLPOUT) in FIG. 3A, to the second driving chip DDIC2 to power-on the second driving chip DDIC2. In addition, the control signal SWIRE of the first driving chip DDIC1 starts carrying information at an end of the power-on sequence. Since both the power enable signal AVDD_EN and the control signal SWIRE are only provided by the first driving chip DDIC1 (i.e. master driving chip) during the power-on sequence, the power enable signal AVDD_EN and the control signal SWIRE of the second driving chip DDIC2 (i.e. signals 310 and 311 in FIG. 3A) are keep in a high impedance state or a weakly pull high state.

After receiving the power enable signal AVDD_EN and the control signal SWIRE by the power circuit 103, the power circuit 103 may transmit power voltages PV (e.g., AVDD, ELVSS, ELVDD) to both the first driving chip DDIC1 and the second driving chip DDIC2. After the power synchronization between the first driving chip DDIC1 and the second driving chip DDIC2 is finished, the first driving chip DDIC1 and the second driving chip DDIC2 may continue communicating with each other by using the timing control signal TC, or the first driving chip DDIC1 and the second driving chip DDIC2 may decouple with each other.

Figure 3B:
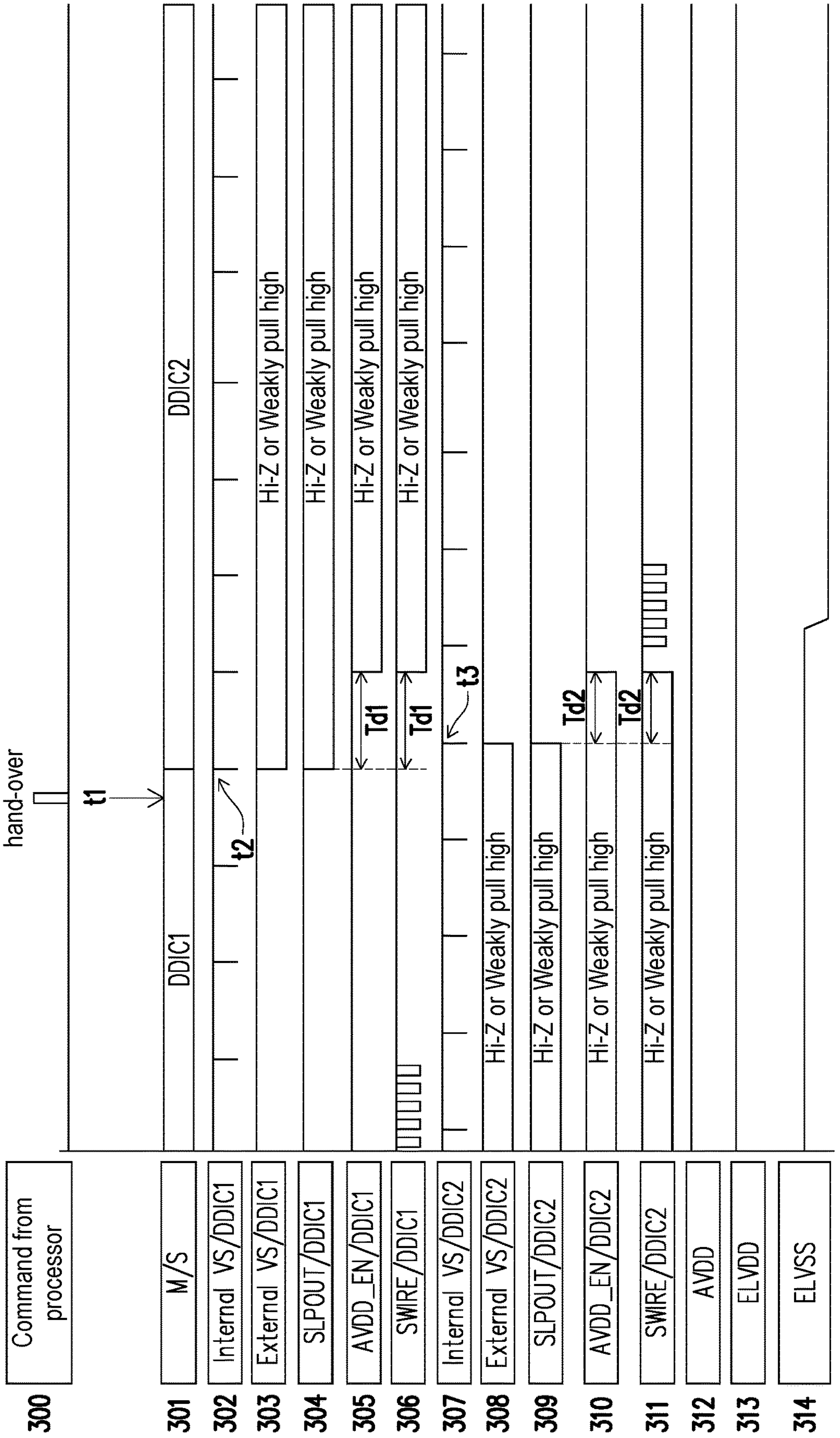
FIG. 3B is a timing diagram illustrating a hand-over operation between the first driving chip DDIC1 and the second driving chip DDIC2 shown in FIG. 2 according to an embodiment of the disclosure.

Referring to FIG. 1, in order to meet some scenarios applicable to the multi-panel display device 100, a role of a master driving chip may be exchanged between the first driving chip DDIC1 and the second driving chip DDIC2. For example, FIG. 3B is a timing diagram illustrating a hand-over operation between the first driving chip DDIC1 and the second driving chip DDIC2 shown in FIG. 2 according to an embodiment of the disclosure. In FIG. 3B, the horizontal axis represents a time axis, and the vertical axis represents a signal level (which is a logic level, not actual magnitude). Initially, the first driving chip DDIC1 is operated as a master driving chip, and the second driving chip DDIC2 is operated as slave driving chip. Referring to signal 300 in FIG. 3B, a processor may transmit a hand-over command HC to both the first driving chip DDIC1 and the second driving chip DDIC2 at a time point t1 for exchanging a role of a master driving chip between the first driving chip DDIC1 and the second driving chip DDIC2. When the first driving chip DDIC1 (i.e. master driving chip) receives the hand-over command HC at the time point t1, the first driving chip DDIC1 may determine a suitable time to turn off both the first switch 2011 and the second switch 2012 by slightly adjusting waveforms of the signals 305 and 306 in FIG. 3B.

For example, referring to FIG. 2 and FIG. 3B, when the first driving chip DDIC1 (i.e. master driving chip) receives the hand-over command HC at the time point t1, the first driving chip DDIC1 may set both the power enable signal AVDD_EN and the control signal SWIRE (i.e. signals 305 and 306 in FIG. 3B) to transit from an active state to a high impedance state (or transit from an active state to a weakly pull high state) after undergoing a first delay time Td1 from a pulse (at a time point t2) of the internal vertical synchronization signal of the first driving chip DDIC1 (i.e., signal 302) which is right after the time point t1 that the hand-over command HC is received by the first driving chip DDIC1. In the embodiment of FIG. 3B, the active state may be a high logic level state, and the high impedance state may be a low logic level state. The first delay time Td1 is adjustable by the first driving chip DDIC1.

Referring to FIG. 2 and FIG. 3B, when the second driving chip DDIC2 (i.e. slave driving chip) receives the hand-over command HC at the time point t1, the second driving chip DDIC2 may determine a suitable time to turn on both the third switch 2021 and the fourth switch 2022 and set both the power enable signal AVDD_EN and the control signal SWIRE of the second driving chip DDIC2 (i.e., signals 310 and 311 in FIG. 3B) to transit from a high impedance state (or weakly pull high state) to an active state after undergoing a second delay time Td2 from a pulse (at a time point t3) of the internal vertical synchronization signal of the second driving chip DDIC2 (i.e., signal 307) which is right after the time point t1 that the hand-over command HC is received by the second driving chip DDIC2. The second delay time Td2 is adjustable by the second driving chip DDIC2.

Figure 3C:
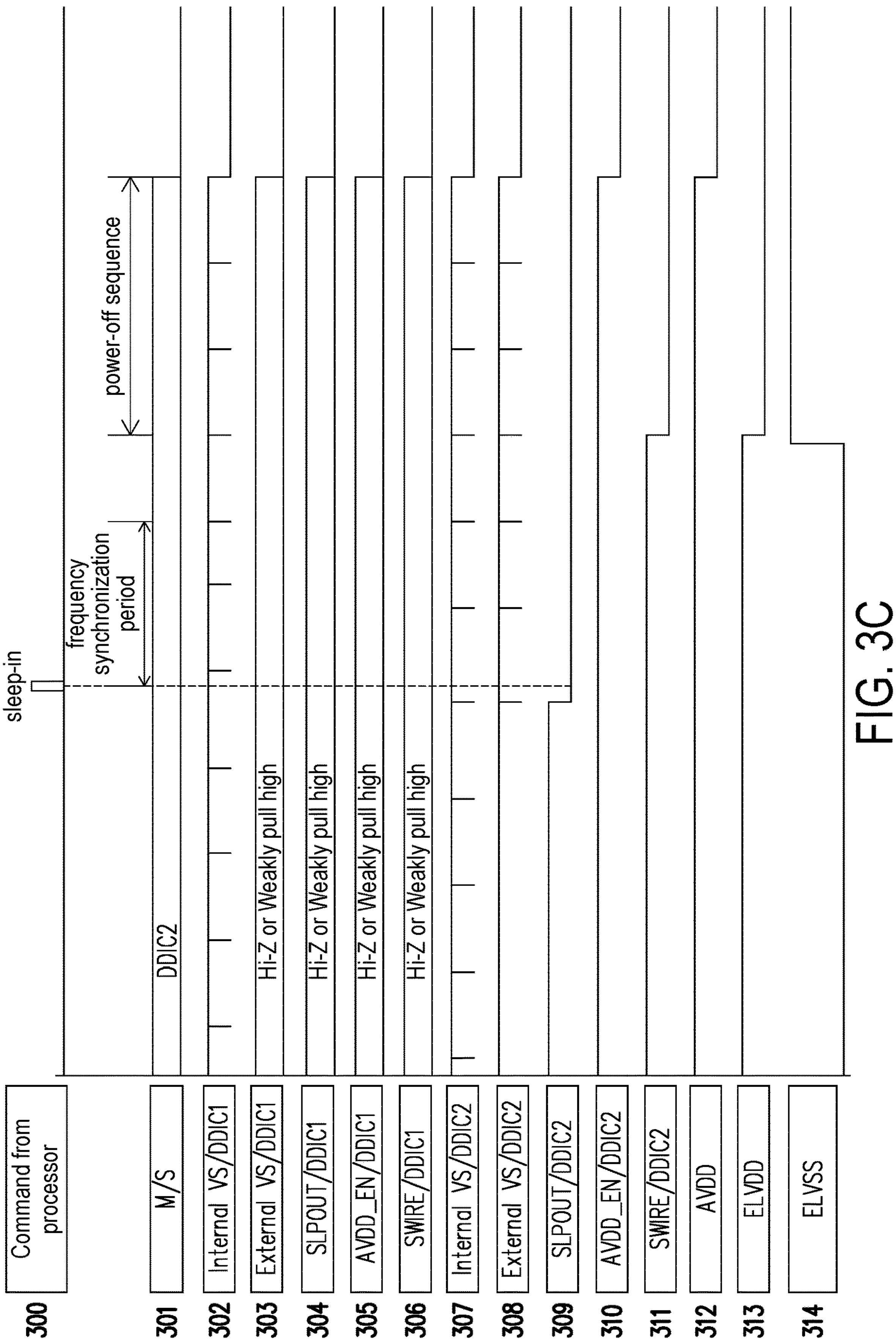
FIG. 3C is a timing diagram illustrating a power-off sequence synchronization between the first driving chip DDIC1 and the second driving chip DDIC2 shown in FIG. 2 according to an embodiment of the disclosure.

FIG. 3C is a timing diagram illustrating a power-off sequence synchronization between the first driving chip DDIC1 and the second driving chip DDIC2 shown in FIG. 2 according to an embodiment of the disclosure. In FIG. 3C, the horizontal axis represents a time axis, and the vertical axis represents a signal level (which is a logic level, not actual magnitude). In the embodiment of FIG. 3C, based on a determination of the identification control signal M/S, the second driving chip DDIC2 is set as a master driving chip, and the first driving chip DDIC1 is set as a slave driving chip. Referring to signal 300 in FIG. 3C, the second driving chip DDIC2 is configured to perform a power-off sequence in response to receiving a sleep-in command from a processor, and the first driving chip DDIC1 is configured to perform a power synchronization operation based on the power-off sequence performed by the second driving chip DDIC2. As shown in FIG. 3C, in response to receiving the sleep-in command from the processor, the sleep-out synchronization signal 309 (SLPOUT) of the second driving chip DDIC2 is pulled to a low logic level and the second driving chip DDIC2 may transmit a timing control signal TC, e.g., an external vertical synchronization signal (i.e. signal 308 in FIG. 3C), to the first driving chip DDIC1 to trigger a frequency adjusting operation performed by the first driving chip DDIC1. Specifically, the first driving chip DDIC1 may adjust an internal vertical synchronization signal (i.e. signal 302 in FIG. 3C) in a frequency synchronization period based on the signal 308 provided by the second driving chip DDIC2, so that the internal vertical synchronization signal of the first driving chip DDIC1 (i.e. signal 302 in FIG. 3C) can synchronize with the external vertical synchronization signal of the second driving chip DDIC2 (i.e. signal 308 in FIG. 3C) after finishing the frequency synchronization period.

In the embodiment of FIG. 3C, since the master driving chip is the second driving chip DDIC2, both the power enable signal AVDD_EN and the control signal SWIRE are only provided by the second driving chip DDIC1 to activate the power-off sequence, and both the power enable signal AVDD_EN and the control signal SWIRE of the first driving chip DDIC1 (i.e. signals 305 and 306 in FIG. 3C) are keep in a high impedance state or in a weakly pull high state.

Figure 4:
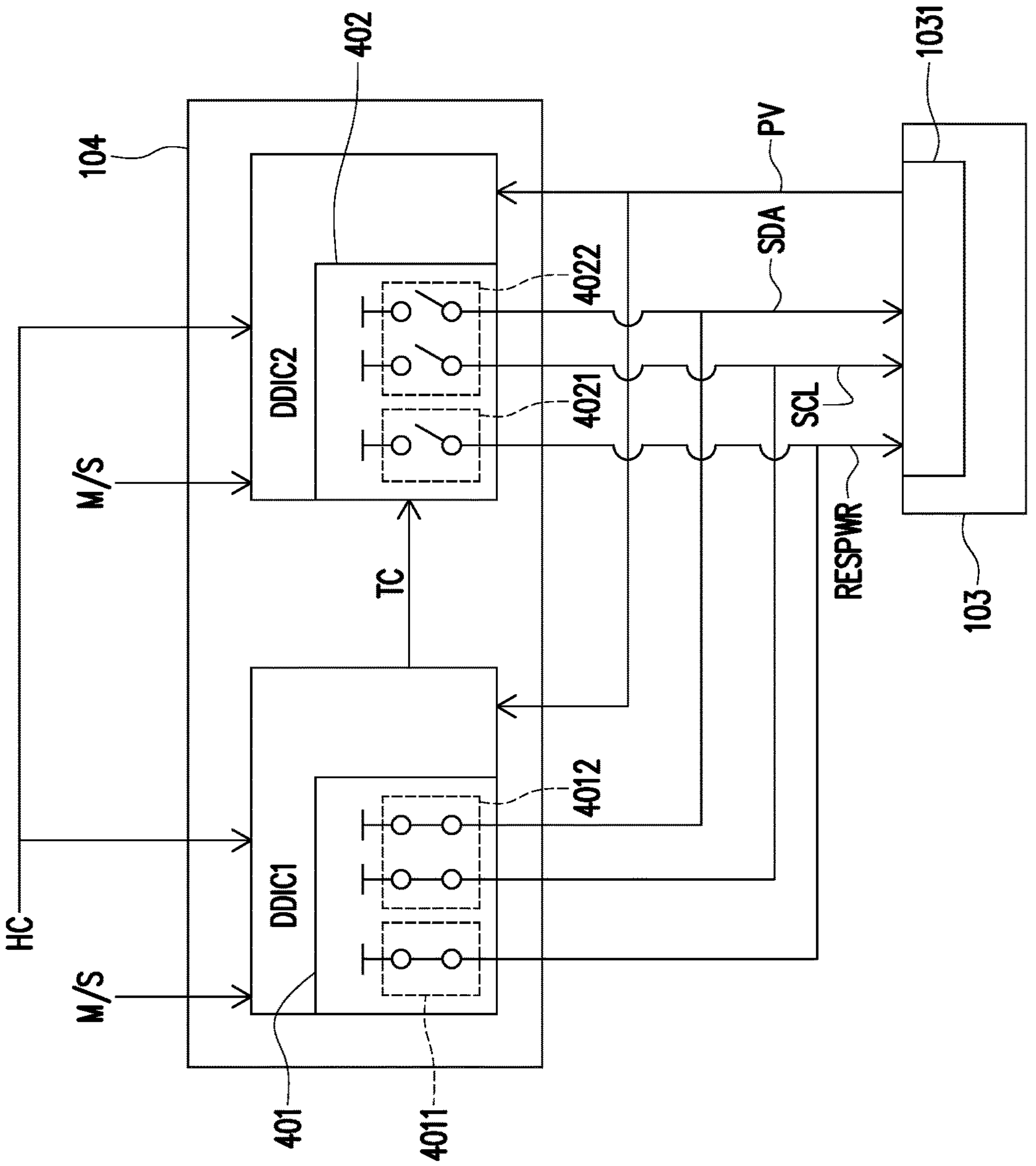
FIG. 4 depicts a communication between a driving circuit 104 and a power circuit 103 according to an embodiment of the disclosure.

Referring to FIG. 1, in another embodiment, the driving circuit 104 may communicate with the power circuit 103 through an Inter-Integrated Circuit (I2C) interface which is another interface protocol different from the SWIRE protocol. For example, FIG. 4 depicts a communication between a driving circuit 104 and a power circuit 103 according to an embodiment of the disclosure. Referring to FIG. 4, the first driving chip DDIC1 of the driving circuit 104 may include an I2C interface 401, and the second driving chip DDIC2 of the driving circuit 104 may include an I2C interface 402. In addition, the I2C interface 401 may include a first switch 4011 for controlling a transmission of a reset signal RESPWR generated by the first driving chip DDIC1, and the I2C interface 401 may include a second switch 4012 for controlling transmissions of both a serial clock signal SCL and a serial data signal SDA generated by the first driving chip DDIC1. Similarly, the I2C interface 402 may include a third switch 4021 for controlling a transmission of a reset signal RESPWR generated by the second driving chip DDIC2, and the I2C interface 402 may include a fourth switch 4022 for controlling transmissions of both the serial clock signal SCL and the serial data signal SDA generated by the second driving chip DDIC2.

The power circuit 103 may include a communication interface 1031 for communicating with the first driving chip DDIC1 and the second driving chip DDIC2. In the embodiment of FIG. 4, the reset signals (RESPWR) of the I2C interface 401 and the I2C interface 402 are coupled to a first terminal of the communication interface 1031. In addition, these serial clock signals SCL of the I2C interface 401 and the I2C interface 402 are coupled to a second terminal of the communication interface 1031, and these serial data signals SDA of the I2C interface 401 and the I2C interface 402 are coupled to a third terminal of the communication interface 1031. In other embodiment, the reset signals (RESPWR), the serial clock signals SCL, and the serial data signals SDA of the I2C interface 401 and the I2C interface 402 may be respectively coupled to different terminals of the communication interface 1031 of the power circuit 103. In other embodiment, the serial clock signals SCL of the I2C interface 401 and the I2C interface 402 may be respectively coupled to different terminals of the communication interface 1031, and the serial data signals SDA of the I2C interface 401 and the I2C interface 402 may be respectively coupled to different terminals of the communication interface 1031.

Referring to FIG. 4, based on a determination of an identification control signal M/S provided by a processor (not shown), the first driving chip DDIC1 is set as a master driving chip, and the second driving chip DDIC2 is set as a slave driving chip. Since the first driving chip DDIC1 in FIG. 4 is set as the master driving chip, only the first driving chip DDIC1 is configured to transmit signals (i.e. reset signal RESPWR, serial clock signal SCL and serial data signal SDA) to the power circuit 103. Specifically, in response to receive a sleep-out command from a processor (not shown), the first driving chip DDIC1 may turn on both the first switch 4011 and the second switch 4012, and the second driving chip DDIC2 may turn off both the third switch 4021 and the fourth switch 4022. Accordingly, only the first driving chip DDIC1 can output the reset signal RESPWR via the first switch 4011, and output both the serial clock signal SCL and the serial data signal SDA via the second switch 4012.

When the power circuit 103 receives the reset signal RESPWR, the serial clock signal SCL and the serial data signal SDA through the communication interface 1031, the power circuit 103 may provide power voltages PV to both the first driving chip DDIC1 and the second driving chip DDIC2. In addition, for some application situations, a processor (not shown) may transmit a hand-over command HC to both the first driving chip DDIC1 and the second driving chip DDIC2 for exchanging a role of a master driving chip between the first driving chip DDIC1 and the second driving chip DDIC2. A detailed power synchronization operation and a detailed hand-over operation may be deduced from the embodiments of FIGS. 3A-3C, and therefore no description will be further provided.

Figure 5:
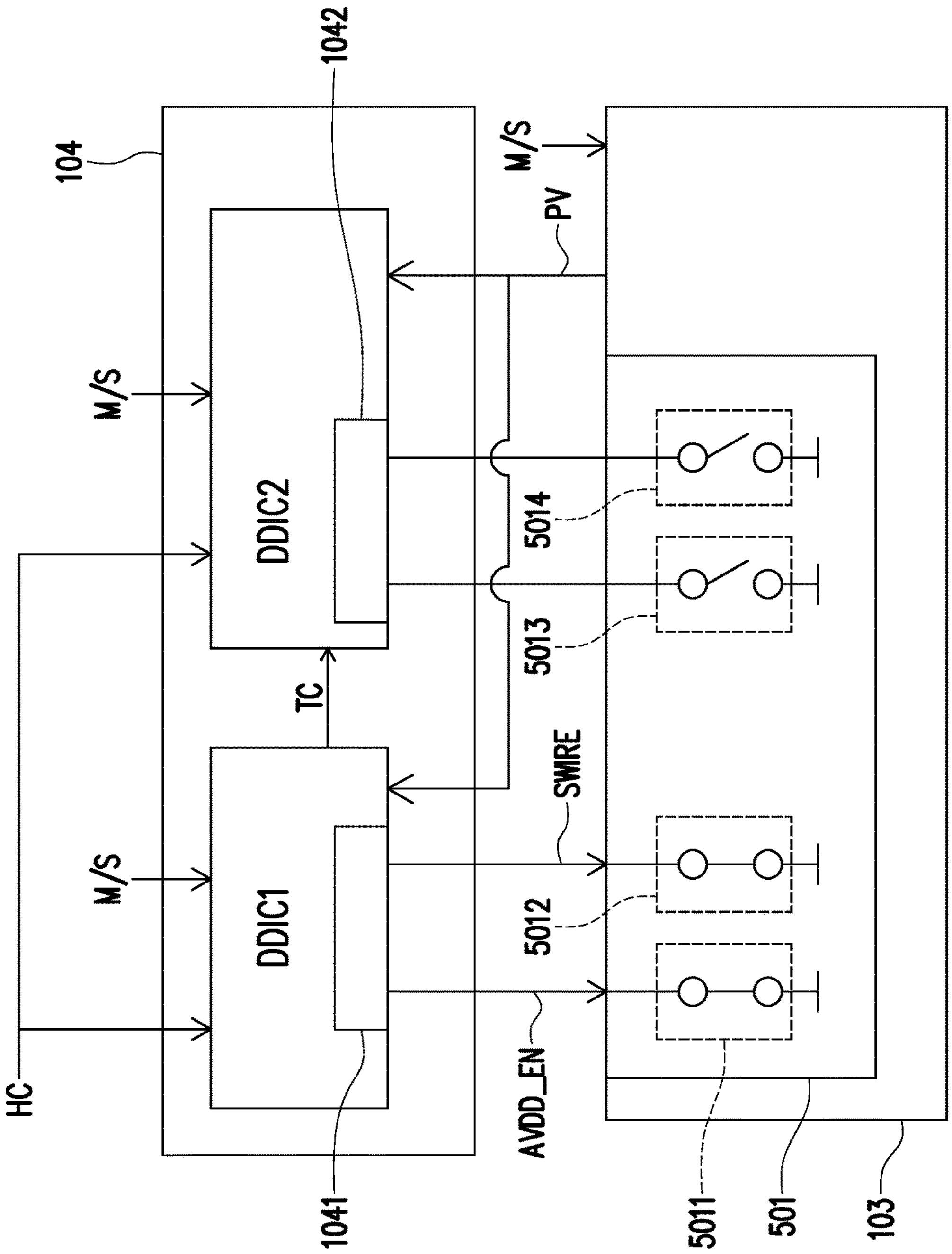
FIG. 5 depicts a detailed connection between the driving circuit 104 and the power circuit 103 shown in FIG. 1 according to another embodiment of the disclosure.

FIG. 5 depicts a detailed connection between the driving circuit 104 and the power circuit 103 shown in FIG. 1 according to another embodiment of the disclosure. Referring to FIG. 5, the first driving chip DDIC1 of the driving circuit 104 may include a transmission interface 1041 for transmitting both an power enable signal AVDD_EN and a control signal SWIRE generated by the first driving chip DDIC1. The second driving chip DDIC2 of the driving circuit 104 may include a transmission interface 1042 for transmitting both an power enable signal AVDD_EN and a control signal SWIRE generated by the second driving chip DDIC2. In FIG. 5, the power circuit 103 may include a communication interface 501 for communicating with the first driving chip DDIC1 and the second driving chip DDIC2. The communication interface 501 includes a first switch 5011, a second switch 5012, a third switch 5013, and a fourth switch 5014. The first switch 5011 and the second switch 5012 are respectively coupled to a first terminal and a second terminal of the transmission interface 1041. The third switch 5013 and the fourth switch 5014 are respectively coupled to a first terminal and a second terminal of the transmission interface 1042.

Referring to FIG. 5, based on a determination of an identification control signal M/S provided by a processor (not shown), the first driving chip DDIC1 is set as a master driving chip, and the second driving chip DDIC2 is set as a slave driving chip. In addition, the processor (not shown) may transmit the identification control signal M/S to the power circuit 103 in order to inform the power circuit 103 that the first driving chip DDIC1 is set as the master driving chip. Therefore, the power circuit 103 may turn on both the first switch 5011 and the second switch 5012, and may turn off both the third switch 5013 and the fourth switch 5014, so that only the first driving chip DDIC1 may output the power enable signal AVDD_EN and the control signal SWIRE to the power circuit 103. In other embodiment, when the second driving chip DDIC2 is set as the master driving chip based on the identification control signal M/S, the power circuit 103 may turn off both the first switch 5011 and the second switch 5012, and may turn on both the third switch 5013 and the fourth switch 5014, so that only the second driving chip DDIC2 may output the power enable signal AVDD_EN and the control signal SWIRE to the power circuit 103.

Referring to FIG. 5, when the power circuit 103 receives the power enable signal AVDD_EN and the control signal SWIRE through the communication interface 501, the power circuit 103 may provide power voltages PV to both the first driving chip DDIC1 and the second driving chip DDIC2. A detailed power synchronization operation and a detailed hand-over operation may be deduced from the embodiments of FIGS. 3A-3C, and therefore no description will be further provided.

Figure 6A:
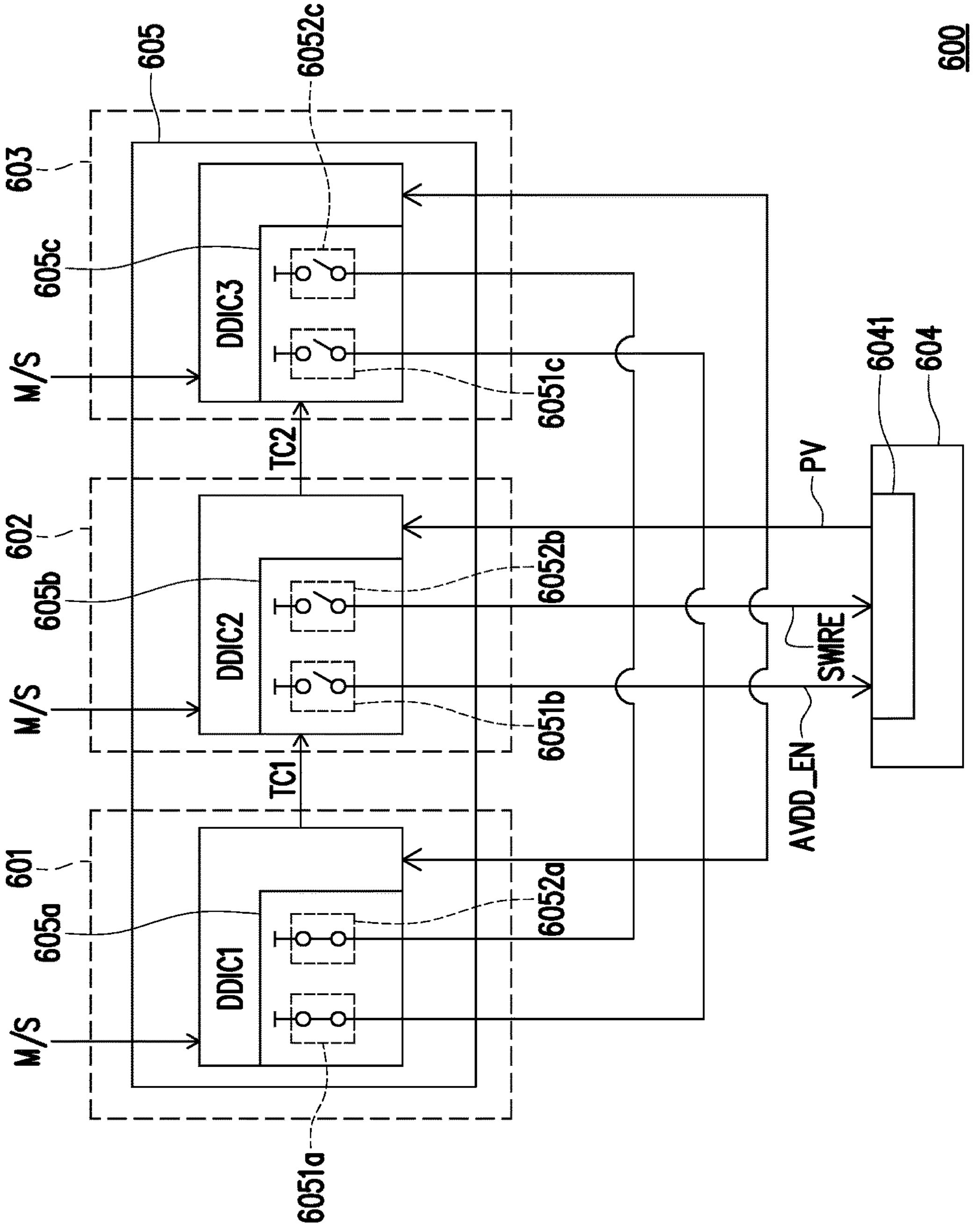
FIG. 6A is a block diagram of a multi-panel display device according to another embodiment of the disclosure.

FIG. 6A is a block diagram of a multi-panel display device according to another embodiment of the disclosure. Referring to FIG. 6A, the multi-panel display device 600 includes a first display panel 601, a second display panel 602, a third display panel 603, a power circuit 604, and a driving circuit 605. The driving circuit 605 includes a first driving chip DDIC1, a second driving chip DDIC2, and a third driving chip DDIC3. The power circuit 604 is shared by the first driving chip DDIC1, the second driving chip DDIC2, and the third driving chip DDIC3. According to design requirements, the power circuit 604 may be realized as a power management integrated circuit (PMIC) which provides suitable power voltages PV to the first driving chip DDIC1, the second driving chip DDIC2, and the third driving chip DDIC3. The first driving chip DDIC1, the second driving chip DDIC2, and the third driving chip DDIC3 may use the power voltages PV to drive the first display panel 601, the second display panel 602, and the third display panel 603, respectively.

Referring to FIG. 6A, the first driving chip DDIC1 of the driving circuit 605 may include a transmission interface 605*a* for transmitting both an power enable signal AVD-D_EN and a control signal SWIRE generated by the first driving chip DDIC1. The second driving chip DDIC2 of the driving circuit 605 may include a transmission interface 605*b* for transmitting both an power enable signal AVD-D_EN and a control signal SWIRE generated by the second driving chip DDIC2. The third driving chip DDIC3 of the driving circuit 605 may include a transmission interface 605*c* for transmitting both an power enable signal AVD-D_EN and a control signal SWIRE generated by the third driving chip DDIC3. In addition, the transmission interface 605*a* of the first driving chip DDIC1 includes a switch 6051*a* and a switch 6052*a*. The transmission interface 605*b* of the second driving chip DDIC2 includes a switch 6051*b* and a switch 6052*b*. The transmission interface 605*c* of the third driving chip DDIC3 includes a switch 6051*c* and a switch 6052*c*.

The power circuit 604 may include a communication interface 6041 for communicating with the first driving chip DDIC1, the second driving chip DDIC2, and the third driving chip DDIC3. As shown in FIG. 6A, the switches 6051*a*, 6051*b*, and 6051*c* are coupled to a first terminal of the communication interface 6041, and the switches 6052*a*, 6052*b*, and 6052*c* are coupled to a second terminal of the communication interface 6041. In other embodiment, each of the switches 6051*a*, 6051*b*, 6051*c*, 6052*a*, 6052*b*, and 6052*c* may be coupled to different terminals of the communication interface 6041.

Referring to FIG. 6A, based on a determination of an identification control signal M/S provided by a processor (not shown), the first driving chip DDIC1 is set as a master driving chip, and the second driving chip DDIC2 and the third driving chips are set as slave driving chips. Since the first driving chip DDIC1 in FIG. 6A is set as the master driving chip, only the first driving chip DDIC1 is configured to transmit the power enable signal AVDD_EN and the control signal SWIRE to the power circuit 604. Specifically, in response to receive a sleep-out command from a processor (not shown), the first driving chip DDIC1 may turn on both the switch 6051*a* and the switch 6052*a*, the second driving chip DDIC2 may turn off both the switch 6051*b* and the switch 6052*b*, and the third driving chip DDIC3 may turn off both the switch 6051*c* and the switch 6052*c*. It should be note that the timing control signal TC2 provided by the second driving chip DDIC2 is synchronized with the timing control signal TC1 provided by the first driving chip DDIC1. Accordingly, only the first driving chip DDIC1 can output the power enable signal AVDD_EN and the control signal SWIRE to the power circuit 604.

Referring to FIG. 6A, when the power circuit 604 receives the power enable signal AVDD_EN and the control signal SWIRE through the communication interface 6041, the power circuit 604 may provide power voltages PV to the first driving chip DDIC1, the second driving chip DDIC2, and the third driving chip DDIC3. Therefore, the first driving chip DDIC1 may perform a power-on sequence (or a power-off sequence), the second driving chip DDIC2 may receive the timing control signal TC1 provided by the first driving chip DDIC1 and perform a power synchronization operation based on the power-on sequence (or a power-off sequence) of the first driving chip DDIC1, and the third driving chip DDIC3 may receive the timing control signal TC2 provided by the second driving chip DDIC2 to perform a power synchronization operation based on the power-on sequence (or a power-off sequence) of the second driving chip DDIC2. Accordingly, the power-on sequences (or the power-off sequences) of the first driving chip DDIC1, the second driving chip DDIC2, and the third driving chip DDIC3 are synchronized with each other. The power synchronization operation of FIG. 6A may be deduced from the embodiments of FIG. 2 and FIGS. 3A-3C, and therefore no description will be further provided.

Figure 6B:
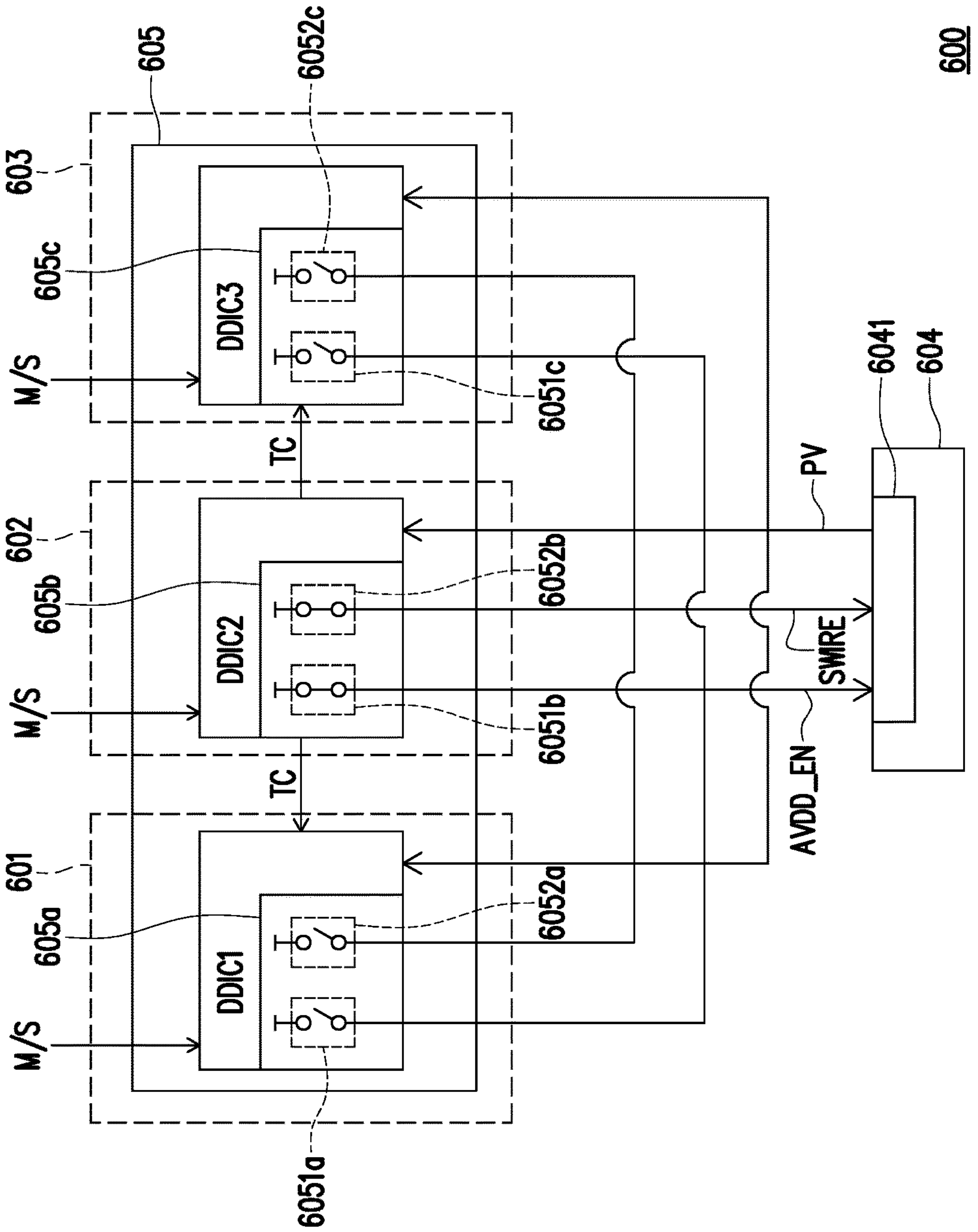
FIG. 6B is a block diagram of a multi-panel display device according to another embodiment of the disclosure.

FIG. 6B is a block diagram of a multi-panel display device according to another embodiment of the disclosure. Referring to FIG. 6B, based on a determination of an identification control signal M/S provided by a processor (not shown), the second driving chip DDIC2 is set as a master driving chip, and the first driving chip DDIC1 and the third driving chips are set as slave driving chips. Since the second driving chip DDIC2 in FIG. 6B is set as the master driving chip, only the second driving chip DDIC2 is configured to transmit the power enable signal AVDD_EN and the control signal SWIRE to the power circuit 604. Specifically, in response to receive a sleep-out command from a processor (not shown), the first driving chip DDIC1 may turn off both the switch 6051*a* and the switch 6052*a*, the second driving chip DDIC2 may turn on both the switch 6051*b* and the switch 6052*b*, and the third driving chip DDIC3 may turn off both the switch 6051*c* and the switch 6052*c*. Accordingly, only the second driving chip DDIC2 can output the power enable signal AVDD_EN and the control signal SWIRE to the power circuit 604.

Referring to FIG. 6B, when the power circuit 604 receives the power enable signal AVDD_EN and the control signal SWIRE through the communication interface 6041, the power circuit 604 may provide power voltages PV to the first driving chip DDIC1, the second driving chip DDIC2, and the third driving chip DDIC3. The power synchronization operation of FIG. 6B may be deduced from the embodiments of FIG. 2 and FIGS. 3A-3C, and therefore no description will be further provided.

Figure 7:
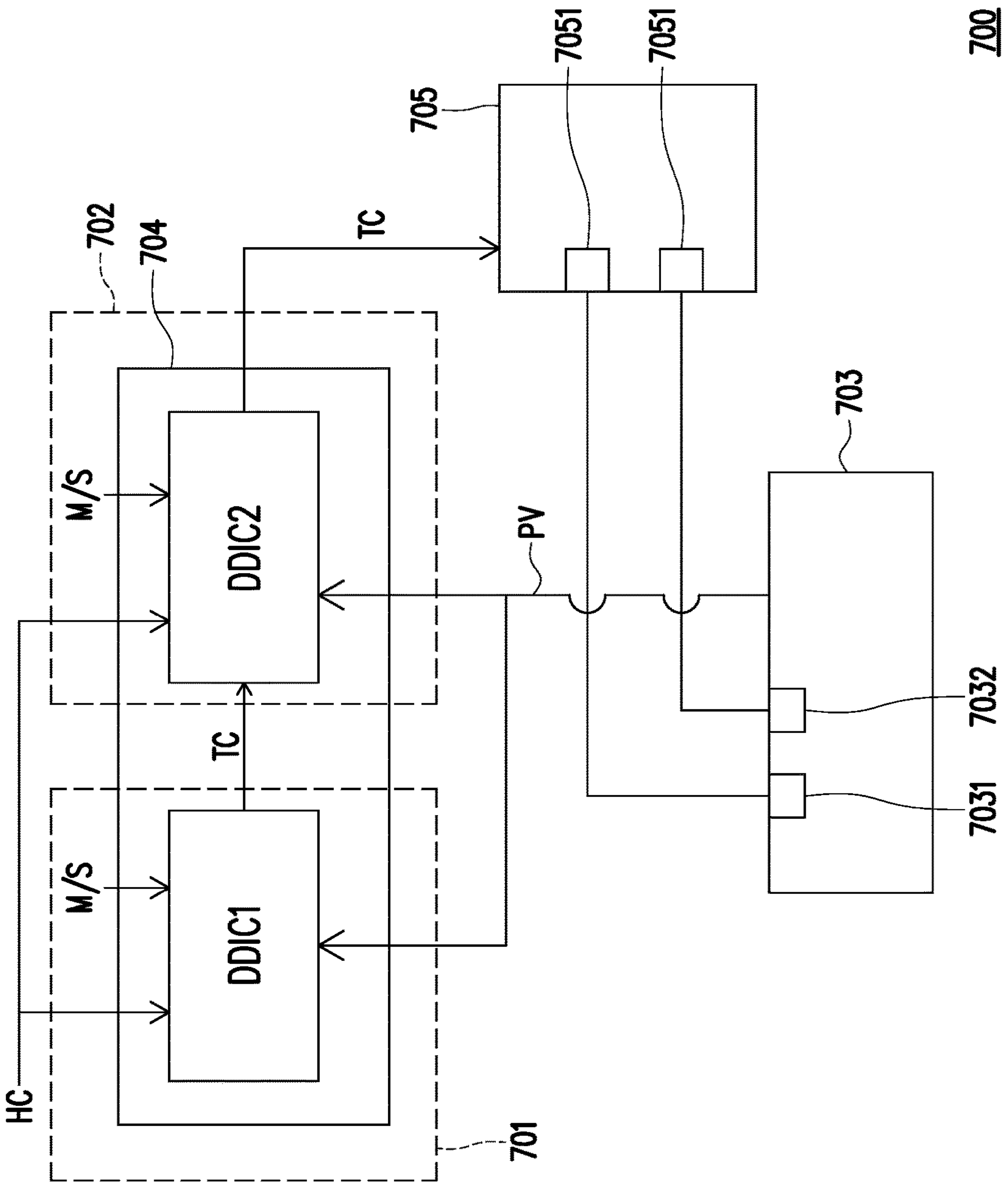
FIG. 7 is a block diagram of a multi-panel display device according to another embodiment of the disclosure.

FIG. 7 is a block diagram of a multi-panel display device according to another embodiment of the disclosure. Referring to FIG. 7, the multi-panel display device 700 includes a first display panel 701, a second display panel 702, a power circuit 703, and a driving circuit 704, and a processor 705. The driving circuit 704 includes a first driving chip DDIC1 and a second driving chip DDIC2. The first driving chip DDIC1 and the second driving chip DDIC2 share a single power circuit 703, and the power circuit 703 is controlled by the processor 705. According to design requirements, the power circuit 703 may be a power management integrated circuit (PMIC), and the processor 705 may be an application processor. For example, the processor 705 may be an application processor (AP) of an OLED foldable (or rollable) mobile phone which serves as the multi-panel display device 700. The power circuit 703 may provide power voltages PV, such as supply voltages AVDD, ELVDD, ELVSS for driving OLED pixel circuits, to both the first driving chip DDIC1 and the second driving chip DDIC2 based on a command provided by the processor 705, so that the first driving chip DDIC1 and the second driving chip DDIC2 may drive the first display panel 101 and the second display panel 102, respectively.

For example, in FIG. 7, the processor 705 includes a first terminal 7051 and a second terminal 7052, and the power circuit 703 includes a third terminal 7031 and a fourth terminal 7032. The first terminal 7051 of the processor 705 is coupled to the third terminal 7031 of power circuit 703, and the second terminal 7052 of the processor 705 is coupled to the fourth terminal 7032 of the power circuit 703. In an embodiment, the processor 705 and the power circuit 703 communicate with each other through an interface of SWIRE protocol such that the processor 705 may transmit a power enable signal AVDD_EN through the first terminal 7051 to the third terminal 7031 of power circuit 703, and the processor 705 may transmit a control signal SWIRE through the second terminal 7052 to the fourth terminal 7032 of the power circuit 703.

In addition, defining a master driving chip and a slave driving chip is realized by a hardware pin of each driving chip of DDIC 1 and DDIC 2, or by a command from the processor 705. In the embodiment of FIG. 7, the first driving chip DDIC1 is set as a master driving chip, and the second driving chip DDIC2 is set as a slave driving chip. Since the first driving chip DDIC1 in FIG. 7 is the master driving chip, the first driving chip DDIC1 is configured to transmit a timing control signal TC to the second driving chip DDIC2.

When the processor 705 transmit the power enable signal AVDD_EN and the control signal SWIRE to the power circuit 703, the power circuit 703 may provide power voltages PV (e.g., AVDD, ELVDD, ELVSS) to the first driving chip DDIC1 and the second driving chip DDIC2 based on the power enable signal AVDD_EN and the control signal SWIRE.

In summary, according to the embodiments of the disclosure, a single power circuit is shared by both a master driving chip and a slave driving chip in a multi-panel display device. The slave driving chip can perform a power synchronization operation to synchronize with the master driving chip based on a timing control signal provided by the master driving chip and based on power voltages provided by the single power circuit. Therefore, the driving circuit and the synchronization method of the disclosure can reduce the number of the power circuits in the multi-panel display device.

Although the disclosure has been disclosed by the above embodiments, they are not intended to limit the disclosure. It will be apparent to one of ordinary skill in the art that modifications and variations to the disclosure may be made without departing from the spirit and scope of the disclosure. Therefore, the scope of the disclosure will be defined by the appended claims.

What is claimed is:

1. A driving circuit of a multi-panel display device, comprising:

a first driving chip, configured to drive a first display panel of the multi-panel display device; and a second driving chip, configured to drive a second display panel of the multi-panel display device, wherein the first driving chip and the second driving chip share a power circuit;

wherein one of the first driving chip and the second driving chip is set as a master driving chip based on a first identification control signal, and the other of the first driving chip and the second driving chip is set as a slave driving chip based on a second identification control signal, wherein the master driving chip is configured to transmit a power enable signal and a control signal to the power circuit, and the power circuit is configured to provide power voltages to the master driving chip and the slave driving chip based on the power enable signal and the control signal, wherein in response to the master driving chip transmitting a timing control signal to the slave driving chip, the slave driving chip performs a power synchronization operation to synchronize with the master driving chip based on the timing control signal.

2. The driving circuit of the multi-panel display device according to claim 1, wherein the slave driving chip is configured to perform the power synchronization operation based on a power-on sequence or a power-off sequence.

3. The driving circuit of the multi-panel display device according to claim 1, wherein a role of the master driving chip is exchanged between the first driving chip and the second driving chip based on a hand-over command transmitted from a processor to both the first driving chip and the second driving chip.

4. The driving circuit of the multi-panel display device according to claim 3, wherein in response to the master driving chip receiving the hand-over command, the master driving chip sets both the power enable signal and the control signal to transit from an active state to a high impedance state or a weakly pull high state after undergoing a first delay time from a pulse of an internal vertical synchronization signal of the master driving chip which is right after that the hand-over command is received by the master driving chip.

5. The driving circuit of the multi-panel display device according to claim 3, wherein in response to the slave driving chip receiving the hand-over command, the slave driving chip sets both the power enable signal and the control signal to transit from a high impedance state or a weakly pull high state to an active state after undergoing a second delay time from a pulse of an internal vertical synchronization signal of the slave driving chip which is right after that the hand-over command is received by the slave driving chip.

6. The driving circuit of the multi-panel display device according to claim 1, wherein the power enable signal and the control signal are transmitted through an Inter-Integrated Circuit (I2C) interface.

7. The driving circuit of the multi-panel display device according to claim 1, wherein the first driving chip comprises:

a first switch, coupled to a first terminal of the power circuit; and a second switch, coupled to a second terminal of the power circuit, wherein the second driving chip comprises:

a third switch, coupled to the first terminal of the power circuit; and a fourth switch, coupled to the second terminal of the power circuit, wherein when the first driving chip is set as the master driving chip, the first driving chip outputs the power enable signal and the control signal to the power circuit via the first switch and the second switch which are turned on, while the third switch and the fourth switch are turned off;

wherein when the second driving chip is set as the master driving chip, the second driving chip outputs the power enable signal and the control signal to the power circuit via the third switch and the fourth switch which are turned on, while the first switch and the second switch are turned off.

8. The driving circuit of the multi-panel display device according to claim 1, wherein when the first driving chip is set as the master driving chip, the first driving chip outputs the power enable signal and the control signal to the power circuit via a first switch of the power circuit and a second switch of the power circuit which are turned on;

wherein when the second driving chip is set as the master driving chip, the second driving chip outputs the power enable signal and the control signal to the power circuit via a third switch of the power circuit and a fourth switch of the power circuit which are turned on.

9. The driving circuit of the multi-panel display device according to claim 1, further comprising:

a third driving chip, configured to drive a third panel of the multi-panel display device, wherein the power circuit is shared by the first driving chip, the second driving chip, and the third driving chip, wherein one of the first driving chip, the second driving chip, and the third driving chip is set as the master driving chip based on the first control signal, and the other two of the first driving chip, the second driving chip, and the third driving chip are set as slave driving chips based on the second control signal, wherein the master driving chip is configured to transmit the power enable signal and the control signal to the power circuit, and the power circuit is configured to provide power voltages to the master driving chip and the slave driving chips based on the power enable signal and the control signal, wherein in response to the master driving chip transmitting the timing control signal to the slave driving chips, the slave driving chips perform the power synchronization operation to synchronize with the master driving chip based on the timing control signal.

10. The driving circuit of the multi-panel display device according to claim 1, further comprising:

a third driving chip, configured to drive a third panel of the multi-panel display device, wherein the power circuit is shared by the first driving chip, the second driving chip, and the third driving chip, wherein one of the first driving chip, the second driving chip, and the third driving chip is set as the master driving chip based on the first control signal, and the other two of the first driving chip, the second driving chip, and the third driving chip are set as a first slave driving chip and a second slave driving chip based on the second control signal, wherein the master driving chip is configured to transmit the power enable signal and the control signal to the power circuit, and the power circuit is configured to provide power voltages to the master driving chip, the second slave driving chip and the third slave driving chip based on the power enable signal and the control signal, wherein in response to the master driving chip transmitting a first timing control signal to the first slave driving chip, the first slave driving chip performs the power synchronization operation to synchronize with the master driving chip based on the first timing control signal, wherein in response to the first slave driving chip transmitting a second timing control signal synchronized with the first timing control signal to the second slave driving chip, the second slave driving chip performs the power synchronization operation to synchronize with the first slave driving chip based on the second timing control signal.

11. A driving circuit of a multi-panel display device, comprising:

a first driving chip, configured to drive a first display panel of the multi-panel display device; and a second driving chip, configured to drive a second display panel of the multi-panel display device, wherein the first driving chip and the second driving chip share a power circuit, and the power circuit is controlled by a processor;

wherein the processor is configured to transmit a power enable signal and a control signal to the power circuit, and the power circuit is configured to provide power voltages to the first driving chip and the second driving chip based on the power enable signal and the control signal, wherein one of the first driving chip and the second driving chip is set as a master driving chip based on a first control signal provided by the processor, and the other of the first driving chip and the second driving chip is set as a slave driving chip based on a second control signal, wherein in response to the master driving chip transmitting a timing control signal to the slave driving chip, the slave driving chip performs a power synchronization operation to synchronize with the master driving chip based on the timing control signal.

12. The driving circuit of the multi-panel display device according to claim 11, wherein the slave driving chip is configured to perform the power synchronization operation based on a power-on sequence or a power-off sequence.

13. The driving circuit of the multi-panel display device according to claim 11, wherein a role of the master driving chip is exchanged between the first driving chip and the second driving chip based on a hand-over command transmitted from the processor to both the first driving chip and the second driving chip.

14. A synchronization method of a driving circuit, adapted to a multi-panel display device, wherein the driving circuit comprises a first driving chip for driving a first display panel of the multi-panel display device and a second driving chip for driving a second display panel of the multi-panel display device, wherein the first driving chip and the second driving chip share a power circuit, the synchronization method of the driving circuit comprising:

setting one of the first driving chip and the second driving chip as a master driving chip based on a first control signal, and setting the other of the first driving chip and the second driving chip as a slave driving chip based on a second control signal;

transmitting a power enable signal and a control signal to the power circuit by the master driving chip;

providing power voltages to the master driving chip and the slave driving chip by the power circuit based on the power enable signal and the control signal;

in response to the master driving chip transmitting a timing control signal to the slave driving chip, performing a power synchronization operation by the slave driving chip to synchronize with the master driving chip based on the timing control signal.

15. The synchronization method of the driving circuit according to claim 14, wherein the slave driving chip performs the power synchronization operation based on a power-on sequence or a power-off sequence.

16. The synchronization method of the driving circuit according to claim 14, further comprising:

transmitting a hand-over command to both the first driving chip and the second driving chip by a processor to exchange a role of the master driving chip between the first driving chip and the second driving chip.

17. The synchronization method of the driving circuit according to claim 16, further comprising:

in response to the master driving chip receiving the hand-over command, setting both the power enable signal and the control signal to transit from an active state to a high impedance state or a weakly pull high state by the master driving chip after undergoing a first delay time from a pulse of an internal vertical synchronization signal of the master driving chip which is right after that the hand-over command is received by the master driving chip.

18. The synchronization method of the driving circuit according to claim 16, further comprising:

in response to the slave driving chip receiving the hand-over command, setting both the power enable signal and the control signal to transit from a high impedance state or a weakly pull high state to an active state by the slave driving chip after undergoing a second delay time from a pulse of an internal vertical synchronization signal of the slave driving chip which is right after that the hand-over command is received by the slave driving chip.

19. The synchronization method of the driving circuit according to claim 14, wherein the driving circuit further comprises a third driving chip for driving a third display panel of the multi-panel display device, and the power circuit is shared by the first driving chip, the second driving chip, and the third driving chip, the synchronization method further comprising:

setting one of the first driving chip, the second driving chip, and the third driving chip as the master driving chip based on the first control signal, and setting the other two of the first driving chip, the second driving chip, and the third driving chip as slave driving chips based on the second control signal;

transmitting the power enable signal and the control signal to the power circuit by the master driving chip;

providing the power voltages to the master driving chip and the slave driving chips by the power circuit based on the power enable signal and the control signal;

in response to the master driving chip transmitting the timing control signal to the slave driving chips, performing the power synchronization operation by the slave driving chips to synchronize with the master driving chip based on the timing control signal.

20. The synchronization method of the driving circuit according to claim 14, wherein the driving circuit further comprises a third driving chip for driving a third display panel of the multi-panel display device, and the power circuit is shared by the first driving chip, the second driving chip, and the third driving chip, the synchronization method further comprising:

setting one of the first driving chip, the second driving chip, and the third driving chip as the master driving chip based on the first control signal, and setting the other two of the first driving chip, the second driving chip, and the third driving chip as a first slave driving chip and a second slave driving chip based on the second control signal;

transmitting the power enable signal and the control signal to the power circuit by the master driving chip;

providing the power voltages to the master driving chip and the slave driving chips by the power circuit based on the power enable signal and the control signal;

in response to the master driving chip transmitting a first timing control signal to the first slave driving chip, performing the power synchronization operation by the first slave driving chip to synchronize with the master driving chip based on the first timing control signal;

in response to the first slave driving chip transmitting a second timing control signal synchronized with the first timing control signal to the second slave driving chip, performing the power synchronization operation by the second slave driving chip to synchronize with the first slave driving chip based on the second timing control signal.

* * * * *